(12) United States Patent
Ushioda et al.

(10) Patent No.: US 6,739,508 B2
(45) Date of Patent: May 25, 2004

(54) EVALUATION APPARATUS WITH VOTING SYSTEM, EVALUATION METHOD WITH VOTING SYSTEM, AND A COMPUTER PRODUCT

(75) Inventors: Akira Ushioda, Kawasaki (JP); Seiji Okura, Kawasaki (JP); Koji Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 09/790,635

(22) Filed: Feb. 23, 2001

(65) Prior Publication Data

US 2002/0038819 A1 Apr. 4, 2002

(30) Foreign Application Priority Data

Aug. 18, 2000 (JP) ........................................ 2000-248938

(51) Int. Cl.$^7$ ............................................... G06F 17/60
(52) U.S. Cl. .................... 235/386; 235/375; 235/381
(58) Field of Search ................... 235/386, 381, 235/375; 705/14, 10, 12

(56) References Cited

U.S. PATENT DOCUMENTS 5,583,763 A * 12/1996 Atcheson et al. ............... 707/3

OTHER PUBLICATIONS

Petras, System for creating and maintaining a database of information utilizing user opinions, Nov. 29, 2001, patent application Publication, US 2001/0047290.*

Epstein, Information collaboration and reliability assessment, Apr. 25, 2002, patent application Publication, US 2002/0049738.*

* cited by examiner

*Primary Examiner*—Michael G. Lee
*Assistant Examiner*—Kimberly D. Nguyen
(74) *Attorney, Agent, or Firm*—Staas & Halsey LLP

(57) ABSTRACT

A control section is used which executes the following steps. That is, a) making a plurality of voters respectively vote evaluation of voting-object information in accordance with an on-line voting system by using a plurality of clients, each client being set at a voters sides, b) calculating average evaluation in accordance with voting results, c) deciding a voter's rank of each of the voters in accordance with a deviation between average evaluation and evaluation by the voter concerned, and d) determining overall evaluation of voting-object information at least in accordance with a result of weighting a voting result correspondingly to the voter's rank.

14 Claims, 20 Drawing Sheets

FIG.4

| | VOTING OBJECT ID000001 | VOTING OBJECT ID000002 | VOTING OBJECT ID000003 | VOTING OBJECT ID000004 | VOTING OBJECT ID000005 | VOTING OBJECT ID000006 |
|---|---|---|---|---|---|---|
| VOTER ID000001 | 5 | 1 | 5 | | | |
| VOTER ID000002 | | 3 | | 2 | 3 | 1 |
| VOTER ID000003 | 4 | 4 | 3 | | 3 | 1 |
| VOTER ID000004 | 4 | | 1 | 2 | 4 | 2 |
| VOTER ID000005 | 3 | | | | 3 | 1 |
| VOTER ID000006 | 2 | 2 | 5 | 4 | | 5 |
| VOTER ID000007 | 1 | 1 | | | 2 | |
| VOTER ID000008 | 4 | 3 | 3 | | | 1 |
| VOTER ID000009 | 4 | | 1 | 5 | 1 | 3 |
| | | | | | | |
| AVERAGE | 4 | 2 | 3 | 3 | 2 | 1 |

FIG.5

| VOTING-OBJECT ID | EVALUATION LEVEL |
|---|---|
| 000001 | 3 |
| 000002 | 5 |
| 000003 | 2 |
| ⋮ | ⋮ |

| VOTER ID | VOTER RANK | NUMBER OF VOTES | ACCUMULATED POINT |
|---|---|---|---|
| 000001 | D | 5 | 10 |
| 000002 | A | 35 | 153 |
| 000003 | B | 58 | 168 |
| ⋮ | ⋮ | ⋮ | ⋮ |

READERS REVIEW

VOTING

THERE IS A CONTRIBUTION OF BOOK REVIEWS FOR WHICH YOUR ARE WAITING FOR.

"NEW MIND OF EMPEROR" ROJA BENROZU     5
"HAL LEGEND" DEBIDDO SUTOKU     3
"SOUND AND LANGUAGE" FURUTO BENGURA     2

WHAT DO YOU THINK ABOUT
THESE OPINIONS ?
PROVIDE US YOUR VIEWS.

"NEW MIND OF EMPEROR" ROJA BENROZU

VERY GOOD (5) ○
GOOD (4) ○
FAIR (3) ●
BAD (2) ○
VERY BAD (1) ○

THAT "EVERY ATTEMPT IS LAUGHINGSTOCK"......

OVERALL EVALUATION: 5

COMMENT

VERY GOOD (5) ○
GOOD (4) ○
FAIR (3) ●
BAD (2) ○
VERY BAD (1) ○

OVERALL EVALUATION: 3

VOTING

FIG.15

| VOTER ID | NAME | VOTER RANK | NUMBER OF VOTES | ACCUMULATED POINT |
|---|---|---|---|---|
| 000001 | TARO FUJITSU | A | 5 | 10 |
| 000002 | JIRO NIPPON | E | 35 | 153 |

FIG.16

| VOTER ID | RESOURCE NAME | OVERALL EVALUATION LEVEL | DOWNLOAD URL | PRICE | MAKER |
|---|---|---|---|---|---|
| 000001 | NKB | 2 | www.aaa.ac.jp | 200,000 Yen | **** |
| 000002 | LLH | 3 | www.bbb.com | 300,000 Yen | **** |
| 000003 | BBC | 5 | www.ccc.co.p | 500,000 Yen | **** |

FIG.21

| VOTER ID | MUSICAL COMPOSITION NAME | OVERALL EVALUATION LEVEL | DOWNLOAD URL | ARTIST NAME |
|---|---|---|---|---|
| 000001 | AAA | 3 | www.ddd.ac.jp | **** |
| 000002 | BBB | 1 | www.eee.com | **** |
| 000003 | CCC | 5 | www.fff.co.p | **** |

US 6,739,508 B2

EVALUATION APPARATUS WITH VOTING SYSTEM, EVALUATION METHOD WITH VOTING SYSTEM, AND A COMPUTER PRODUCT

FIELD OF THE INVENTION

The present invention in general relates to a technology of voting a voting object (such as book review, commodity, music, or various resources) and performing evaluation in accordance with a voting result through Internet. More particularly this invention relates to a technology for obtaining objective and high-reliability evaluation.

BACKGROUND OF THE INVENTION

A method of voting for a voting object by many voters and performing evaluation in accordance with voting results has been used so far in various fields. In the case of a conventional vote, however, a problem occurs in which illegal voting is performed in order to arbitrarily manipulate a voting result by a person assuming a legal voter and thereby, it is difficult to secure the reliability of a voting result. Particularly, in the case of the voting using Internet that has been rapidly spread, the probability is very high, in which the above illegal voting is performed. Therefore, means and method for effectively solving the above problem have been eagerly requested.

To evaluate a commodity or the like, a voting system of making many voters select one of evaluation levels at a plurality of stages (very good, good, fair, bad, very bad) has been widely used so far. For example, a voter (in this case, purchaser of a commodity) enters a voting result in a voting postcard attached to the commodity and then, posts it for the commodity provider. Then, the commodity provider performs evaluation and marketing analysis of the commodity by totalizing voting results entered in voting postcards.

Moreover, a voting-system for performing voting through Internet has been recently used in order to improve the totalizing efficiency of voting results. In the case of the voting system of this type, a voting object is inserted in a home page of Internet and a voter accessing the home page is allowed to vote the object through Internet. This result is counted in real time.

As described above, however, in the case of a conventional voting system through Internet, it is possible for a person assuming a legal voter to arbitrarily illegally manipulate a voting result by abusing anonymity. Therefore, when the above illegal manipulation is performed, the reliability of the evaluation according to a voting result is extremely deteriorated and therefore, a problem occurs that it is impossible to perform objective and fair evaluation.

SUMMARY OF THE INVENTION

It is an object of this invention to provide a method and system capable of preventing illegal manipulation of a voting result and performing objective and fair evaluation. It is another object of this invention to provide a computer readable recording medium that stores a computer program which when executed realizes the method according to the present invention.

The system according to one aspect of the present invention comprises a voting unit for making a plurality of voters respectively vote the evaluation of information to be voted in accordance with a voting system; an average-evaluation calculating unit for calculating average evaluation in accordance with voting results by the voting unit; a voting-rank deciding unit for deciding a voter rank of each of the voters in accordance with a deviation between the average evaluation and the evaluation by the voter concerned; and an overall-evaluation determining unit for determining the overall evaluation of the information to be voted in accordance with a result of weighting a voting result by the voting unit correspondingly to a voter rank.

According to the above system, a voter rank is decided in accordance with a deviation between average evaluation with a voting system and evaluation by a voter and overall evaluation is determined in accordance with a result of weighting a voting result correspondingly to a voter rank. Therefore, it is possible to prevent illegal manipulation of a voting result and perform objective and fair evaluation.

The method according to another aspect of the present invention comprises a voting step of making a plurality of voters respectively vote the evaluation of information to be voted with a voting system, an average-evaluation calculating step of calculating average evaluation in accordance with voting results by the voting step; a voting-rank deciding step of deciding a voter rank of each of the voters in accordance with a deviation between the average evaluation and evaluation by the voter concerned; and an overall-evaluation determining step of determining the overall evaluation of the information to be voted in accordance with a result of weighting a voting result in the voting step correspondingly to a voter rank.

According to the above method, a voter rank is decided in accordance with a deviation between average evaluation with a voting system and evaluation by a voter and a result of weighting a voting result correspondingly to a voter rank. Therefore, it is possible to prevent illegal manipulation of a voting result and perform objective and fair evaluation.

Other objects and features of this invention will become apparent from the following description with reference to the accompanying drawings.

BRIEF DESCRIPTION OF THE DRAWINGS

FIG. 4 is an illustration showing the voter-classified voting-result database 33 shown in FIG. 1;

FIG. 5 is an illustration showing the voting-object-classified voting-result database 34 shown in FIG. 1;

FIG. 6 is an illustration showing the voter-information database 35 shown in FIG. 1;

FIG. 9 is an illustration showing the voting screen 40 of the first embodiment;

FIG. 15 is an illustration showing the voter-information database 93 shown in FIG. 14;

FIG. 16 is an illustration showing the voting-object database 92 shown in FIG. 14;

FIG. 21 is an illustration showing the voting-object database 112 shown in FIG. 20;

DESCRIPTION OF THE PREFERRED EMBODIMENTS

Four preferred embodiments of the evaluation apparatus with a voting system, an evaluation method with a voting system, and a computer-readable recording medium storing an evaluation program with a voting system according to the present invention are explained below in detail by referring to the accompanying drawings.

Figure 1:
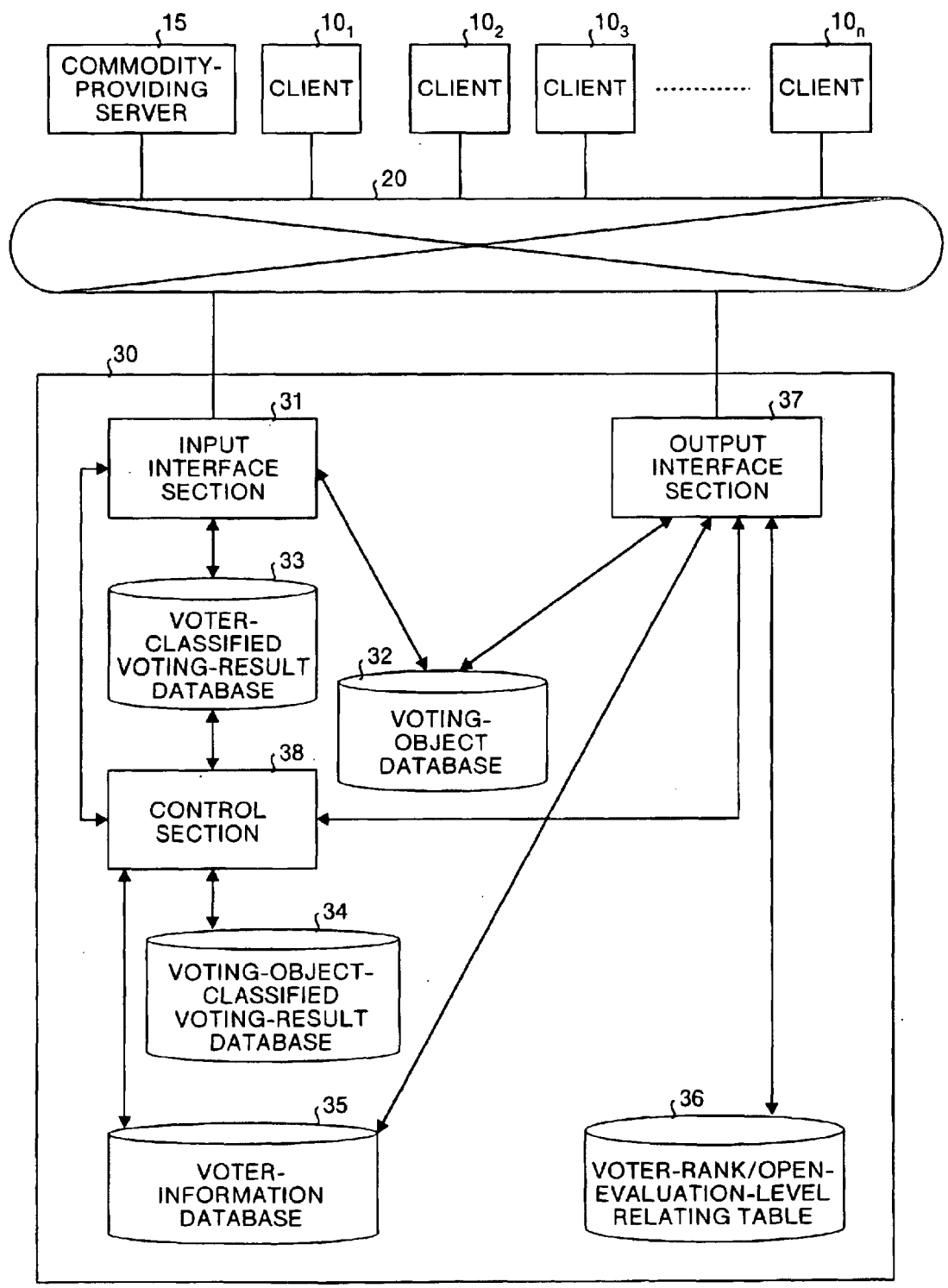
FIG. 1 is a block diagram showing a configuration of a first embodiment of the present invention.

First, first embodiment is described. For this first embodiment, a case is described in which a book review is contributed by a member of a book-review club sponsored by a bookstore or the book review of another person is evaluated in accordance with a voting system. FIG. 1 is a block diagram showing a configuration of the first embodiment of the present invention.

The clients $10_1$ to $10_n$ are computer terminals set for a plurality of members one each, which are connected to Internet 20. Each of the clients $10_1$ to $10_n$ can access a commodity-providing server 15 or a voting/evaluation apparatus 30 to be described later through the Internet 20, which is used for on-line purchase of a commodity (in this case, book), contribution of a book review, or voting.

The commodity-providing server 15 is a server for providing a book on-line purchase site managed by a bookstore for a member or a general purchaser. The book on-line purchase site is a site for purchasing a book through the Internet 20. The voting/evaluation apparatus 30 is connected to the Internet 20 and has a function for accepting contributed book reviews, a function for managing voting of book reviews, and a function for totalizing voting results.

Figure 3:
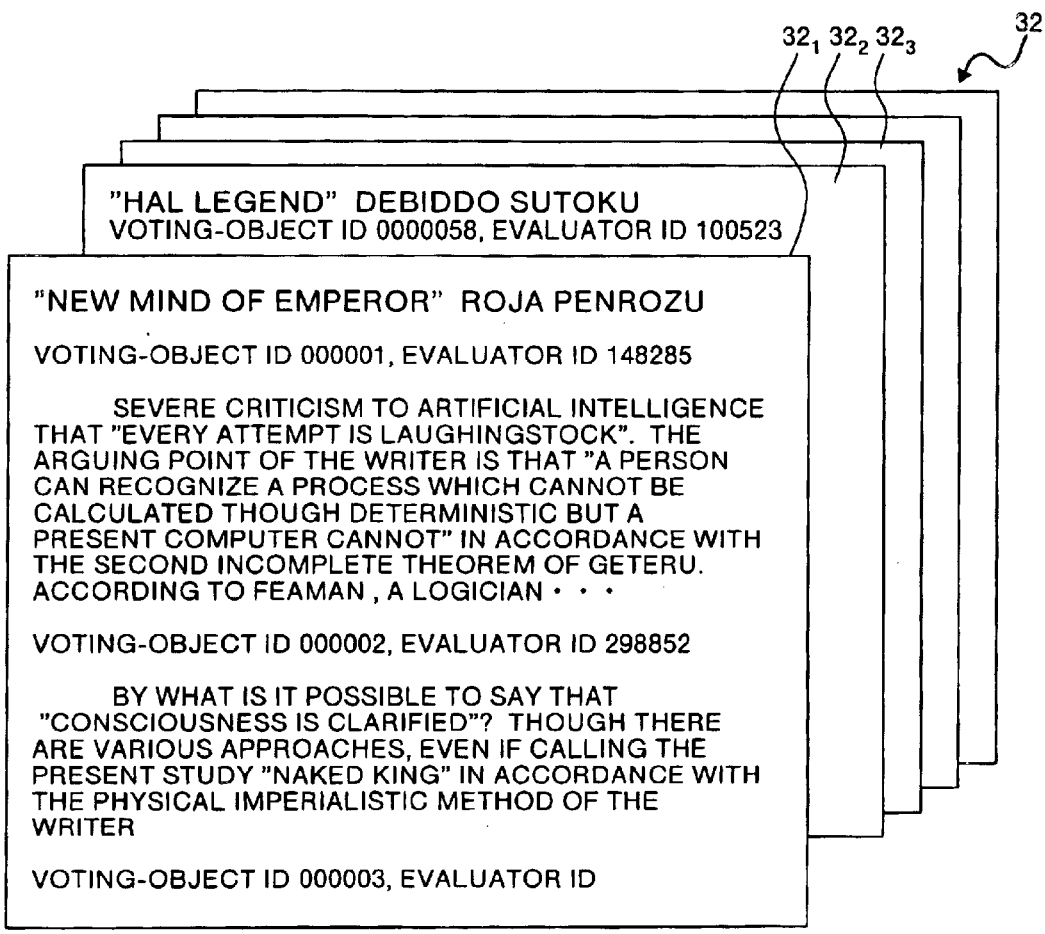
FIG. 3 is an illustration showing the voting-object database 32 shown in FIG. 1.

In the voting/evaluation apparatus 30, an input interface section 31 has a function for accepting accesses of the clients $10_1$ to $10_n$ and a function for updating a voting-object database 32 and a voter-classified voting-result database 33. As shown in FIG. 3, the voting-object database 32 is a database for storing the information on a voting object (in this case, book review relating to book) and is constituted of pieces of voting-object information $32_1$ to $32_3$, . . .

Each of the pieces of voting-object information $32_1$ to $32_3$, . . . is a piece of information on a book review for each book. For example, the piece of voting-object information $32_1$ is constituted of a plurality of book reviews (voting objects) relating to the book having a title of "New Mind of Emperor". Each book review is provided with a voting-object ID and an evaluator ID for identifying a person (evaluator) who contributed a book review. The evaluator reads a book of "New Mind of Emperor" and then, contributes book reviews. These book reviews (voting objects) are voted by the above members in accordance with evaluation levels of five stages.

Moreover, the voter-classified voting-result database 33 shown in FIG. 4 is a database showing the relation between a voting object (in this case, book review) and a voting result. The voting object ID 000001 shown in FIG. 4 corresponds to the voting object (book review) of the voting-object ID 000001 of the piece of voting-object information 32, shown in FIG. 3. Subsequently similarly, the voting object IDs 000002, . . . correspond to the voting objects (book reviews) of the voting object IDs 000002, . . . of the piece of voting-object information $32_1$ shown in FIG. 3.

Moreover, in FIG. 4, the voter of a voter ID 000001 votes the voting object of the voting-object ID 000001 in accordance with the evaluation level "5" (voting result) of the evaluation levels of five stages described above. Explanatory notes of the evaluation levels "1" to "5" are shown below.

| Evaluation level | Explanatory note |
| --- | --- |
| "1" | Very bad |
| "2" | Bad |
| "3" | Fair |
| "4" | Good |
| "5" | Very good |

That is, the voter of the voter ID 000001 shown in FIG. 4 reads the voting object (book review) of the voting object ID 000001, feels "very good", and votes the evaluation level "5". Moreover, the voter reads the voting object (book review) of the voting ID 000002 shown in FIG. 3, feels "very bad", and votes the evaluation level "1". Furthermore, an average value of evaluation levels are stored in the record of "average" shown in FIG. 4 every voting object.

The voting-object-classified voting-result database 34 is provided with fields of "voting-object ID" and "evaluation level" as shown in FIG. 5, which is generated in accordance with the voter-classified voting-result database 33 (refer to FIG. 4). That is, "voting-object IDs" shown in FIG. 5 correspond to the voting-object IDs shown in FIG. 4 and "evaluation levels" are calculated in accordance with the evaluation levels shown in FIG. 4 and voter ranks to be mentioned later.

The voter-information database 35 is provided with fields of "voter ID", "voter rank", "voting frequency", and "accumulated point", as shown in FIG. 6, which is a database for storing the basic information on voters. "Voter ID" denotes an identifier for identifying a voter. "Voter rank" shows the evaluation skill of a voter at five stages of A to E.

In this case, the evaluation skill denotes a skill for performing the same evaluation as that by a mainstream voter and performing a high-reliability evaluation. For example, a voter at "voter rank"="A" is a person who performs the highest-reliability evaluation. Subsequently, evaluation skill lowers such as "voter ranks"= "B"→"C"→"D" and a voter at "voter rank"="E" is a person who performs the lowest-reliability evaluation.

"Voting frequency" denotes a frequency of voting of voting objects. "Accumulated point" denotes a value obtained by accumulating a point provided in accordance with "voter rank" whenever voting is performed, which serves as an index showing an evaluation skill. That is, a voter having a high "accumulated point" has a high voting frequency and a high evaluation skill but a voter having a low "accumulated point" has a low voting frequency and a low evaluation skill. In the case of the first embodiment, a newly-registered voter starts with "voter rank"="E" (lowest rank), whose accumulated point increases by continuing a high-reliability evaluation. When the accumulated point exceeds a preset threshold value, the voter is upgraded to the next "voter rank". Moreover, "accumulated point" is used for incentive (present, pay) calculation as a compensation for voting.

The voter-rank/open-evaluation-level relating table 36 is provided with fields of "voter rank" (refer to FIG. 7) and "open-evaluation level", which is a table for prescribing a range of voting objects (book reviews) to be opened to voters (members). "Open-evaluation level" corresponds to "evaluation level" shown in FIG. 5. For example, all voting objects (book reviews) of evaluation levels "1" to "5" are opened to a voter having "voter rank"="A".

Though voting objects of evaluation levels "1" to "4" are opened to a voter having "voter rank"="B", a voting object of evaluation level="5" is not opened to the voter. Hereafter, as "voter rank" lowers (B→C→D→E), a range of voting objects to be opened becomes narrow. Only voting objects of evaluation level="1" and "2" are opened to voters having "voter ranks"="D" and "E".

Output interface section 37 has a function for outputting information to external access means such as clients $10_1$ to $10_n$. A control section 38 controls operations of the input interface section 31 and the output interface section 37 and updates the voting-object-classified voting-result database 34 and the voter-information database 35. Details of operations of the control section 38 will be described later.

Then, operations of the first embodiment are described below by referring to the flowchart shown in FIG. 8. In step SA1, the control section 38 determines whether there is a member registration request. In this case, when there is a member registration request output from the client $10_1$, the control section 38 sets the determination result in step SA1 to "Yes". When the determination result in step SA1 is "No", the control section 38 performs determination in step SA4.

In step SA2, the control section 38 executes member registration process. Specifically, the control section 38 makes the client display a member registration screen for registering member information. Then, when a name or the like is input by an operator of the client $10_1$ as member information, the control section 38 provides a voter ID for the member concerned, sets a voter rank to "E" (lowest rank), and adds the voter ID and voter rank to the voter-information database 35 shown in FIG. 6. Thereby, the member has a right for voting voting-object information. In this case, "voting frequency" and "accumulated point" corresponding to the member are both sets to 0.

In step SA3, the input interface section 31 executes voting-object registration. Specifically, the input interface section 31 accepts the registration of voting-object information (in this case, book review described by the member) from the member and then, provides a voting-object ID and an evaluator ID for the voting-object information and adds the information to the voting-object database 32.

In step SA4, the control section 38 determines whether a voting request is issued. In this case, when a voting request is issued from a voter for operating the client $10_1$ the control section 38 sets a determination result in step SA4 to "Yes". However, when a determination result in step SA4 is "No", the control section 38 performs determination in step SA9. In this case, in step SA5, the control section 38 makes the client $10_1$ display the voting screen 40 shown in FIG. 9.

The voting screen 40 is a screen for voting the evaluation of voting-object information (book) corresponding to a book of a voter. On the voting screen 40, pieces of voting-object information 41, 42, . . . extracted from the voting-object database 32 are displayed. Moreover, evaluation levels are set to five stages from very bad (1) to very good (5).

A voter confirms the pieces of voting-object information 41, 42, . . . and selects one of the five-stage evaluation levels and then presses a voting button 43 to perform voting. In step SA6, the control section 38 executes the update for reflecting the voting result on the voter-classified voting-result database 33 shown in FIG. 4. In step SA7, the control section 38 performs evaluation-level calculation for calculating an evaluation level of a voting object and then, updates the voting-object-classified voting-result database 34 shown in FIG. 5 in accordance with the result of the evaluation level calculation.

An example of evaluation level calculation is described below in detail by using the voting object (book review) of the voting-object ID 000001 shown in FIG. 4. In this case, the control section 38 extracts voter ranks of voters (voter IDs 000001, 000003 to 000009, . . . in FIG. 4) who vote the voting object (book review) from the voter-information database 35 shown in FIG. 6. Then, the control section 38 relates the following weights to the extracted voter ranks.

| Voter rank | Weight |
| --- | --- |
| A | 1.0 |
| B | 0.8 |
| C | 0.6 |
| D | 0.4 |
| E | 0.2 |

Each of the above weights is set to a larger value as a voter rank rises and set to a smaller value every 0.2 as a voter rank lowers. Then, the control section 38 weights each evaluation level present in the field of the voter ID 000001 shown in FIG. 4 correspondingly to each of the above voter ranks, calculates an average of these weights by dividing the sum of the weights by the number of voters, and uses the average as the evaluation level shown in FIG. 5. The evaluation level is calculated in accordance with the following expression (1).

Evaluation level={(evaluation level of voter×weight corresponding to voter rank)+(evaluation level of voter×weight corresponding to voter rank)+ . . . . }/total number of voters (1)

When applying the above expression (1) to the case of the voting-object ID 000001 shown in FIG. 4, the evaluation level is calculated as shown below.

Evaluation level={(evaluation level 5 of voter ID 000001×weight corresponding to voter rank D (refer to FIG. 6)+(evaluation level 4 of voter ID 000003×weight of 0.8 corresponding to voter rank B (refer to FIG. 6)+ . . . )/total number of voters=4

The control section 38 stores the evaluation level (average) 4 in an "evaluation level" corresponding to the voting-object ID 000001 of the voting-object-classified voting-result database 34 shown in FIG. 5. Thereafter, the control section 38 sequentially calculates an evaluation level (average) corresponding to other voting object and reflects the calculation results on the voting-object-classified voting-result database 34.

In step SA8, the control section 38 calculates points and voter ranks of voters who perform voting in step SA5 in accordance with voting results and then, updates the voter-information database 35 shown in FIG. 6. That is, the control section 38 calculates a point in accordance with a deviation between an evaluation level (average) and a voting result (evaluation level) calculated in step SA7. A point value increase as the deviation decreases but it decreases as the deviation increases.

Figure 2:
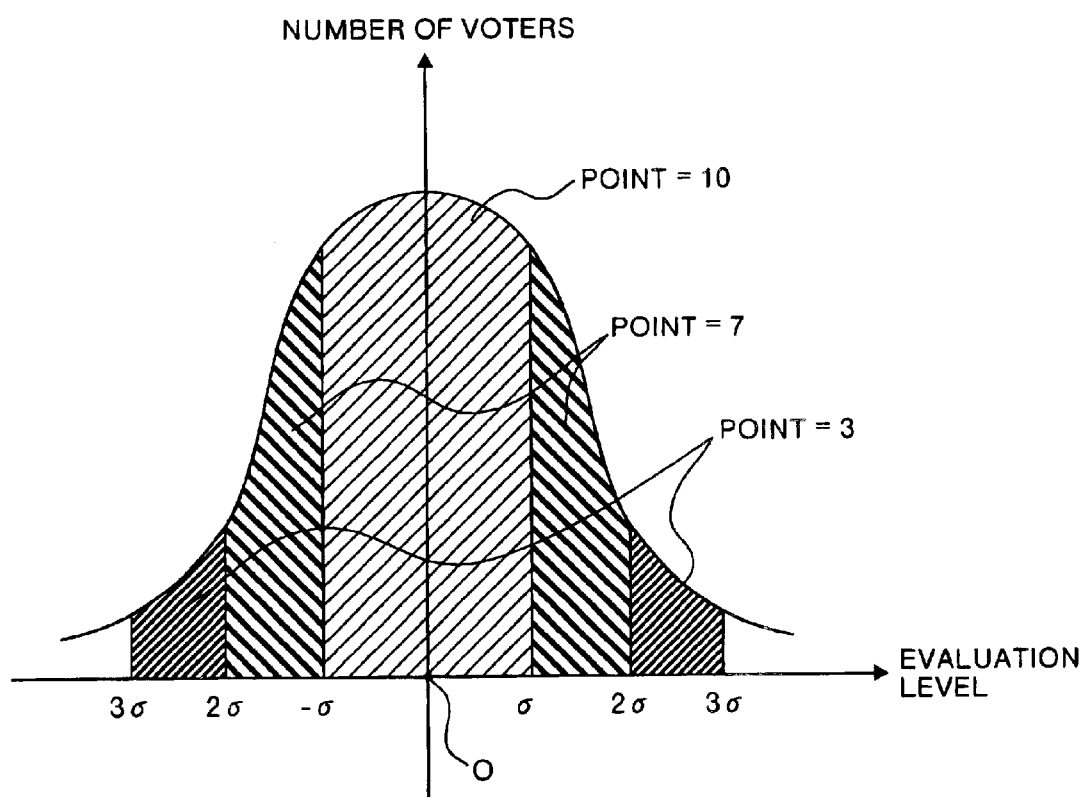
FIG. 2 is an illustration showing a voting distribution in the case of first to four embodiments.

Specifically, as shown in FIG. 2, it is estimated that the number of voters almost conforms to a normal distribution by assuming an evaluation level (average) 0 as the maximum value. Therefore, in the case of the first embodiment, as the deviation between evaluation level (voting result) and evaluation level (average) 0 of a voter decreases, it can be said that the reliability of a voting result (evaluation level) rises because the voter belongs to majority. However, as the deviation between evaluation level (voting result) and evaluation level (average) 0 of a voter increases, it can be said that the reliability of a voting result (evaluation level) lowers because the voter belongs to minor.

In this case, the relation between deviation $\Delta s$ and point in FIG. 2 is shown below.

| Deviation $\Delta s$ | Point |
|---|---|
| $-\sigma \leq \Delta s \leq +\sigma$ | 10 |
| $-2\sigma \leq \Delta s < -\sigma, +\sigma < \Delta s \leq +2\sigma$ | 7 |
| $-3\sigma \leq \Delta s < -2\sigma, +\sigma 2 < \Delta s \leq +3\sigma$ | 3 |
| $-4\sigma \leq \Delta s < -3\sigma, +\sigma 3 < \Delta s \leq +4\sigma$ (Not illustrated) | 1 |
| $-4\sigma > \Delta s, 4\sigma < \Delta s$ (Not illustrated) | 0 |

In the case of the voter having the voter ID 000001 shown in FIG. 4, the control section 38 sets the voting frequency of this time to "3" because of voting three voting objects having the voting object IDs 000001 to 000003. Moreover, the control section 38 calculates points (e.g. 7, 7, and 3) for each voting object in accordance with the above deviation. The control section 38 adds the calculated voting frequency (=3) and points (=7+7+3) to the "voting frequency" and "accumulated point" of the voter ID 000001 of the voter-information database 35 shown in FIG. 6.

Then, the control section 38 divides an accumulated point in the voter-information database 35 by a voting frequency and calculates a voter rank after voting in accordance with the following average-point/voter-rank relating table by assuming the division result as an average point. The control section 38 updates the "voter rank" in the voter-information database 35 shown in FIG. 6 in accordance with the calculated voter rank.

| Average point P | Voter rank |
|---|---|
| $8 \leq P \leq 10$ | A |
| $6 \leq P < 8$ | B |
| $4 \leq P < 6$ | C |
| $2 \leq P < 4$ | D |
| $0 \leq P < 2$ | E |

Thus, in the case of the first embodiment, when continuously performing high-reliability evaluation, an average point rises and a voter rank stepwise rises. In the case of the first embodiment, however, when continuously performing low-reliability evaluation, an average point lowers and a voter rank stepwise lowers (or the voter rank is kept at the voter rank E (lowest rank).

In step SA9, the control section 38 determines whether an evaluation-information reading request is issued by a voter (in this case, reader). When the determination result is "No", the control section 38 executes processings in and after step SA1. The evaluation information includes voting-object information (in this case, book review) and an evaluation level according to the voting described above (refer to FIG. 5). In this case, when the above reading request is issued by the voter having the voter ID 000002 shown in FIG. 6 by using the client 10₂, the control section 38 sets the determination result in step SA9 to "Yes".

In step SA10, the output interface section 37 makes the client 10₂ display a retrieval screen (not illustrated) for retrieving a book corresponding to the voting-object information to be read by the voter concerned. The retrieval screen is a screen for retrieving a desired book out of a plurality of books by using the title of the book as a keyword. In this case, when the title of the book is input by the voter, the output interface section 37 retrieves the voting-object database 32 (refer to FIG. 3) in step SA11 and makes the client 10₂ display the retrieval-result screen 50 shown in FIG. 10 as a retrieval result. The title of the retrieved book is displayed on the retrieval-result screen 50.

Figure 10:
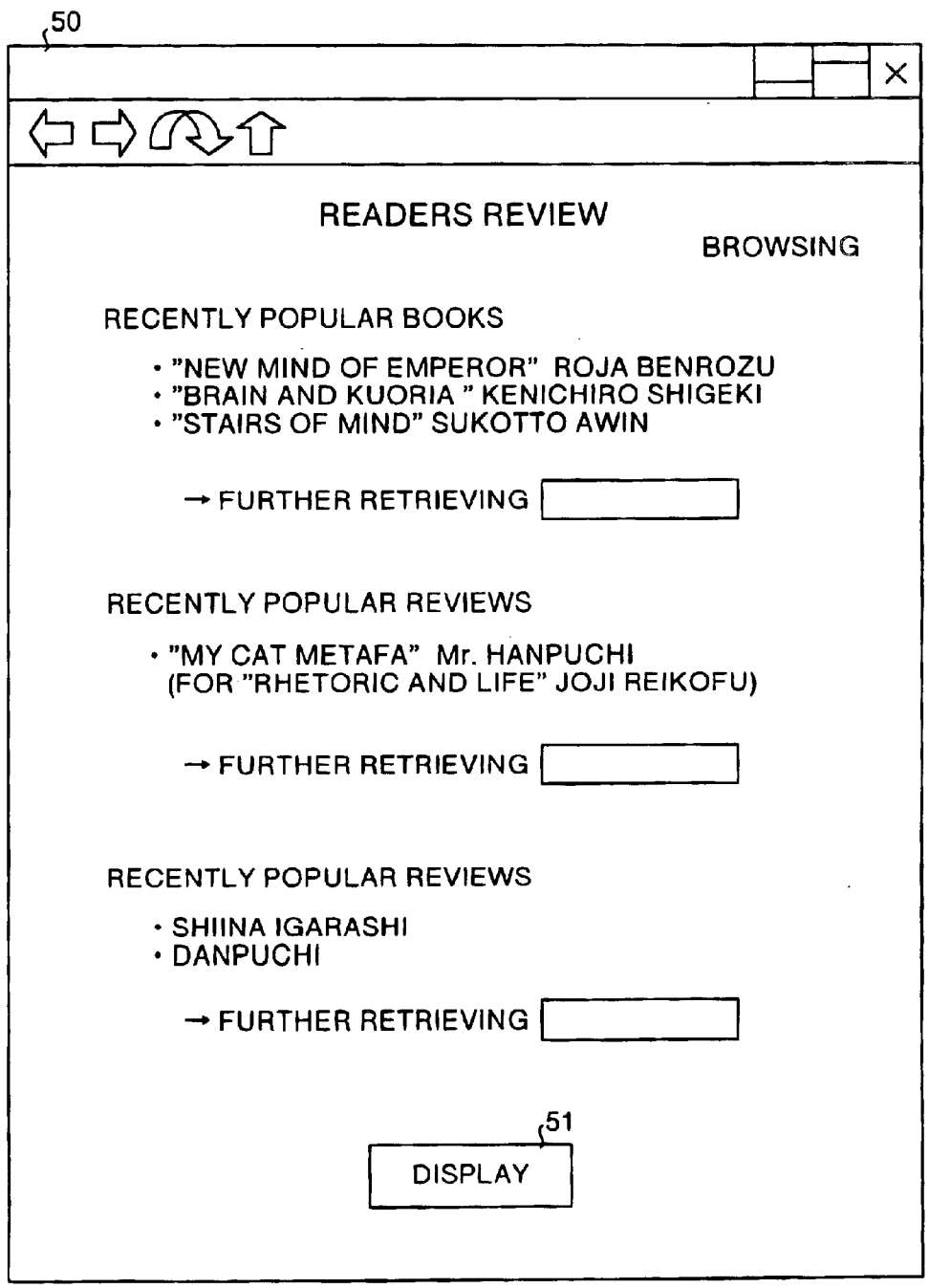
FIG. 10 is an illustration showing the retrieval-result screen 50 of the first embodiment.
Figure 11:
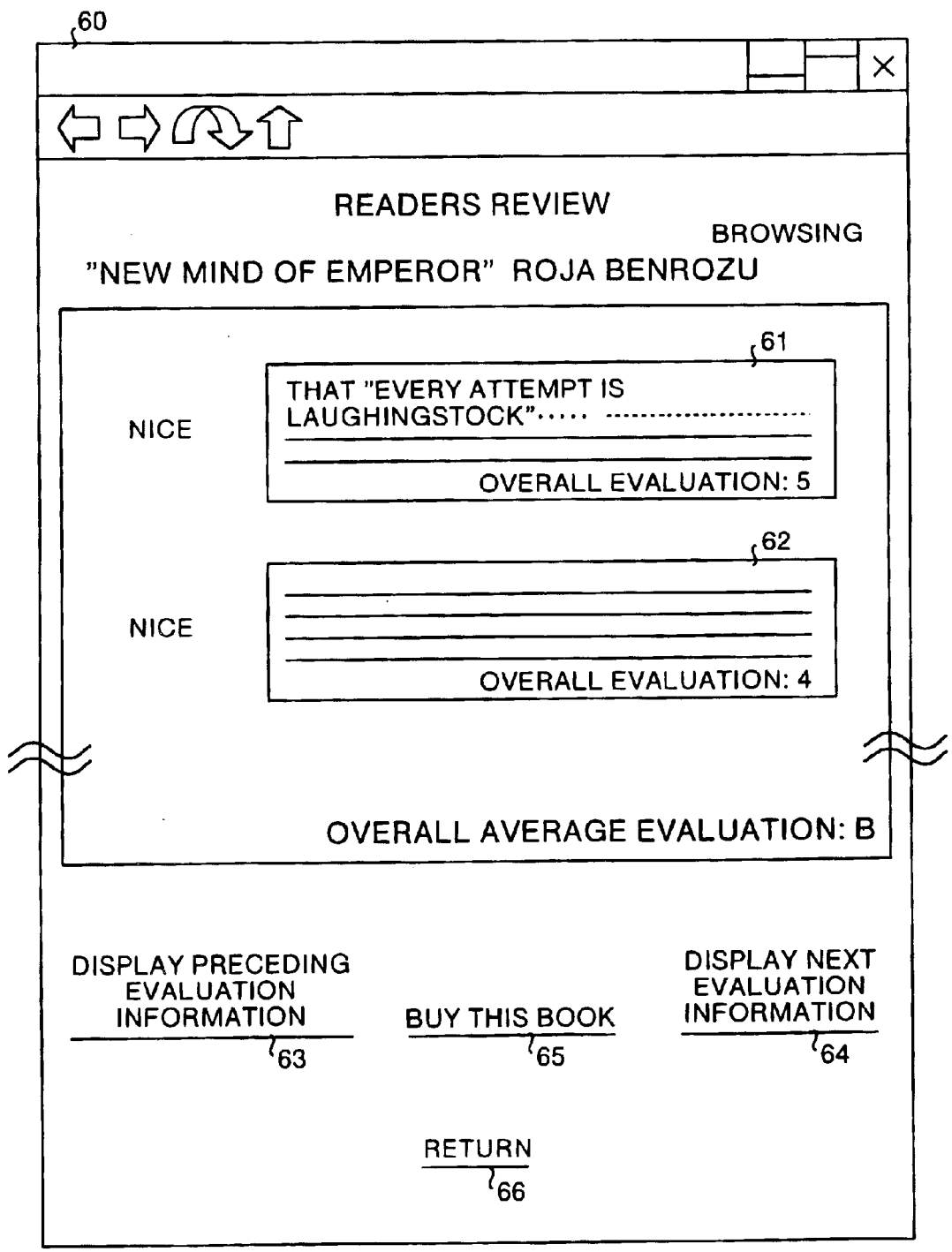
FIG. 11 is an illustration showing the evaluation-information screen 60 of the first embodiment.

In this case, when the reading button 51 shown in FIG. 10 is pressed, the output interface section 37 makes the client 10₂ display the evaluation information screen 60 shown in FIG. 11 in step SA12. Specifically, the output interface section 37 refers to the voter-information database 35 shown in FIG. 6 to confirm the voter rank A corresponding to the voter ID 000002. Then, the output interface section 37 refers to the voter-rank/open-evaluation-level relating table 36 shown in FIG. 7 by using the voter rank A as a key to confirm open-evaluation levels (1, 2, 3, 4, and 5) corresponding to the voter rank A.

The output interface section 37 refers to the voting-object database 32 shown in FIG. 2 to retrieve voting-object information by using the title of a book desired by a voter as a key. Then, the output interface section 37 retrieves a voting-object ID and an evaluation level in the voting-object-classified voting-result database 34 shown in FIG. 5 by using a voting-object ID included in the retrieved voting-object information as a key and then, retrieves voting objects (book reviews) having voting-object IDs corresponding to open evaluation levels (in this case, 1, 2, 3, 4, and 5) shown in FIG. 7 in the voting-object database 32.

The output interface section 37 makes the client 10₂ display the evaluation-information screen 60 shown in FIG. 11. In the evaluation-information screen 60, pieces of voting-object information (in this case, book reviews) corresponding to the open evaluation levels (refer to FIG. 7) are included in pieces of evaluation information 61 and 62. "Overall evaluations" shown in FIG. 11 correspond to "evaluation levels" shown in FIG. 5. Moreover, a reading button 63 for reading the preceding evaluation information, a reading button 64 for reading the following evaluation information, a purchasing button 65 for purchasing the book concerned, and a returning button 66 for returning to the preceding screen are displayed on the evaluation-information screen 60.

That is, a voter requesting reading of evaluation information can read the voting-object information and evaluation level in a range corresponding to the voter level of his own. Therefore, a voter having the voter rank A (refer to FIG. 7)

can read the voting-object information at all evaluation levels. However, a voter having the level E (refer to FIG. 7) can only read pieces of voting-object information having low evaluation levels (1 and 2).

In step SA13, the control section 38 determines whether the purchasing button 65 shown in FIG. 11 is pressed. When the determination result is "No", processings in and after step SA1 are repeated. However, when the determination result is "Yes", the control section 38 requests purchase processing to the commodity-providing server 15 in step SA14. Thereby, the commodity-providing server 15 makes the client $10_2$ display a book purchasing screen and then, executes the processing for on-line purchase of the book concerned in accordance with purchase application information.

As described above, according to the first embodiment, a voter rank is decided in accordance with a deviation between average evaluation with a voting system and evaluation by a voter and overall evaluation relating to a book review is determined in accordance with a result of weighting a voting result correspondingly to a voter rank. Therefore, it is possible to prevent illegal manipulation of a voting result and perform objective and fair evaluation.

Moreover, an incentive point is provided for a voter in accordance with a voter rank. Therefore, it is possible to improve the will of a voter and resultantly obtain a high-reliability evaluation.

Figure 7:
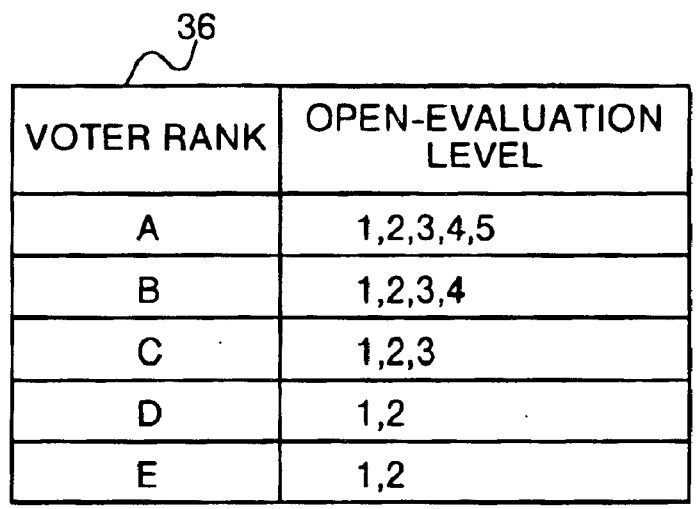
FIG. 7 is an illustration showing the voter-rank/open-evaluation-level relating table 36 shown in FIG. 1.

Furthermore, the range of open evaluation levels is controlled in accordance with a voter rank as shown in FIG. 7. Therefore, it is possible to awaken the will for raising a voter rank for a voter in order to widen an open range.

The first embodiment is a case in which a book review is used as voting-object information. However, the voting-object information is not restricted to a book review. It is also allowed to use commodity evaluation information (such as use feeling) as the voting-object information. This case is described below as second embodiment.

Figure 12:
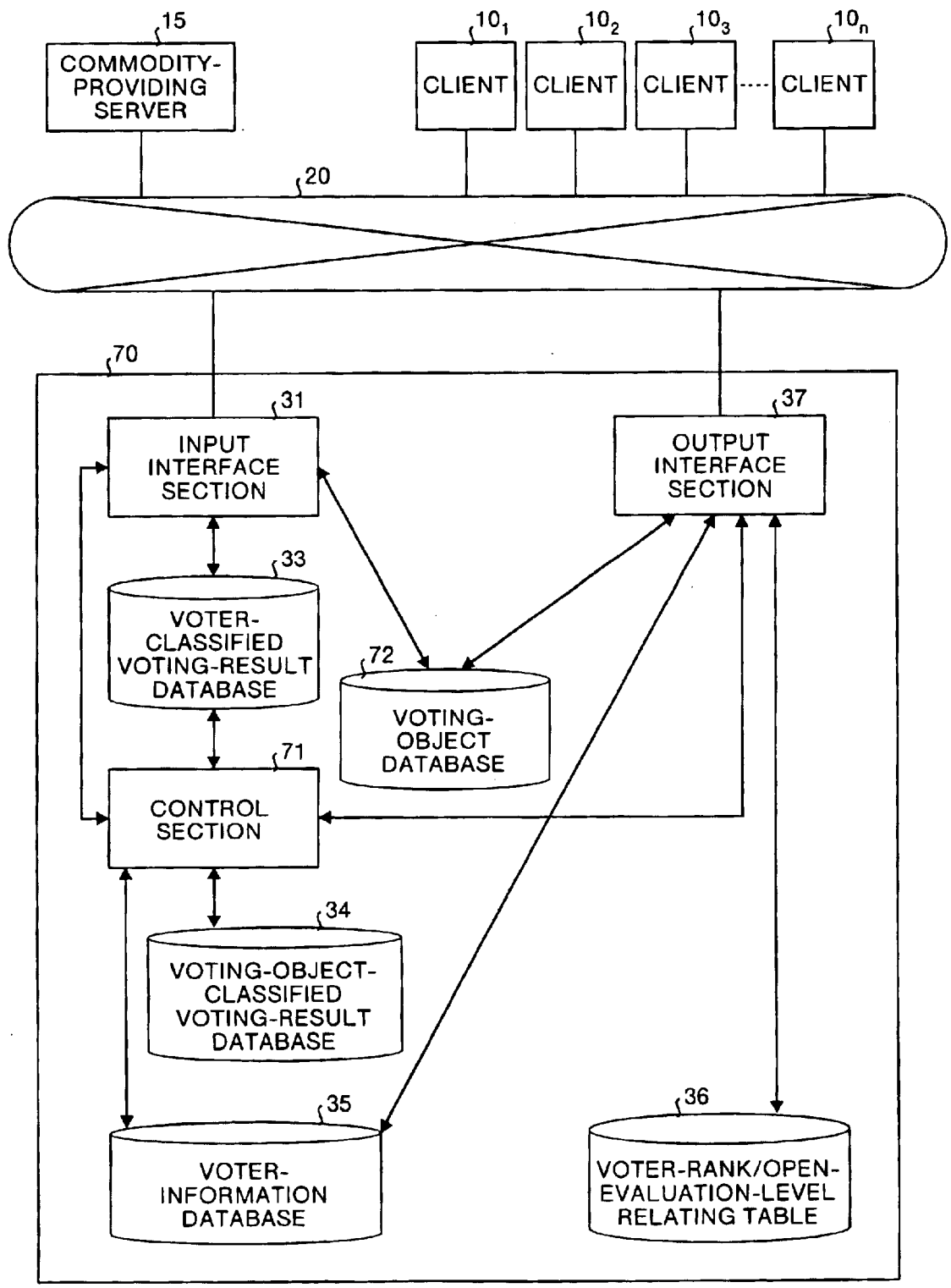
FIG. 12 is an illustration showing a configuration of a second embodiment.

FIG. 12 is a block diagram showing a configuration of the second embodiment of the present invention. In FIG. 12, a portion corresponding to a portion in FIG. 1 is provided with the same legends. A voting/evaluation apparatus 70 is used instead of the voting/evaluation apparatus 30 shown in FIG. 1. In the voting/evaluation apparatus 70, a control section 71 and a voting-object database 72 are used instead of the control section 38 and voting-object database 32 shown in FIG. 1.

Moreover, in the case of the second embodiment, a commodity-providing server 15 is a server for providing a commodity on-line purchase site managed by a commodity provider for a member or a general purchaser. The commodity on-line purchase site is a site for purchasing a commodity through Internet 20. The voting/evaluation apparatus 70 is connected to Internet 20 similarly to the case of the voting/evaluation apparatus 30 (refer to FIG. 1) and has functions for performing acceptance of contributed voting-object information (in this case, commodity evaluation information), voting management of a voting object, and totalization of voting results.

Figure 13:
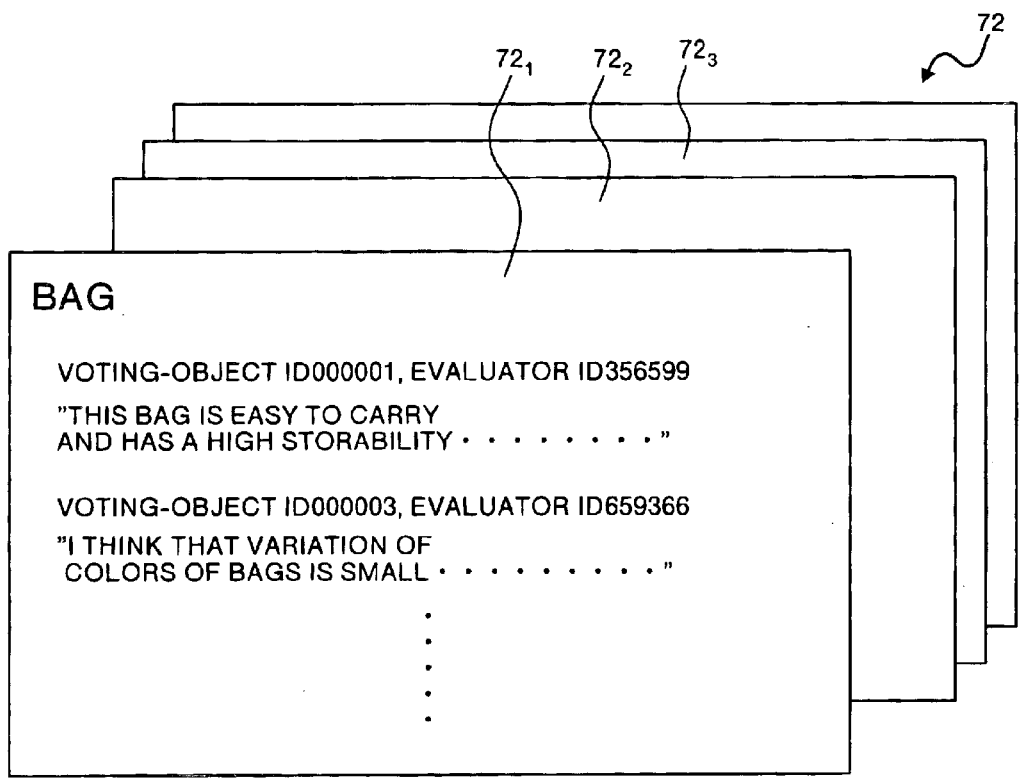
FIG. 13 is an illustration showing the voting-object database 72 shown in FIG. 12.

As shown in FIG. 13, the voting-object database 72 is a database for storing a voting-object information (in this case, commodity evaluation information) for each commodity 20 and is constituted of pieces of voting-object information $72_1$ to $72_3$, . . . Each of pieces of voting-object information $72_1$ to $72_3$, . . . is evaluation information on each commodity.

For example, the piece of voting-object information $72_1$ is constituted of a plurality of voting objects (evaluation information) relating to a "bag" as a commodity. A voting-object ID and an evaluator ID for identifying a person (evaluator) contributing evaluation information are provided for each piece of voting information similarly to the case of the first embodiment. The above evaluator contributes the impression and opinion of actually using "bag" as evaluation information. These pieces of voting-object information are voted by members in accordance with five-stage evaluation levels similarly to the case of the first embodiment. Because basic operations of the second embodiment are the same as those of the first embodiment (refer to FIG. 8), their detailed descriptions are omitted.

As described above, according to the second embodiment, a voter rank is decided in accordance with a deviation between average evaluation with a voting system and evaluation by a voter and overall evaluation relating to commodities is determined in accordance with a result of weighting a voting result correspondingly to a voter rank. Therefore, it is possible to prevent illegal manipulation of a voting result and perform objective and fair evaluation.

The first embodiment is a case in which a book review is used as voting-object information. However, voting-object information is not restricted to a book review. It is also allowed to use a resource such as software as the voting-object information. This case is described below as third embodiment.

Figure 14:
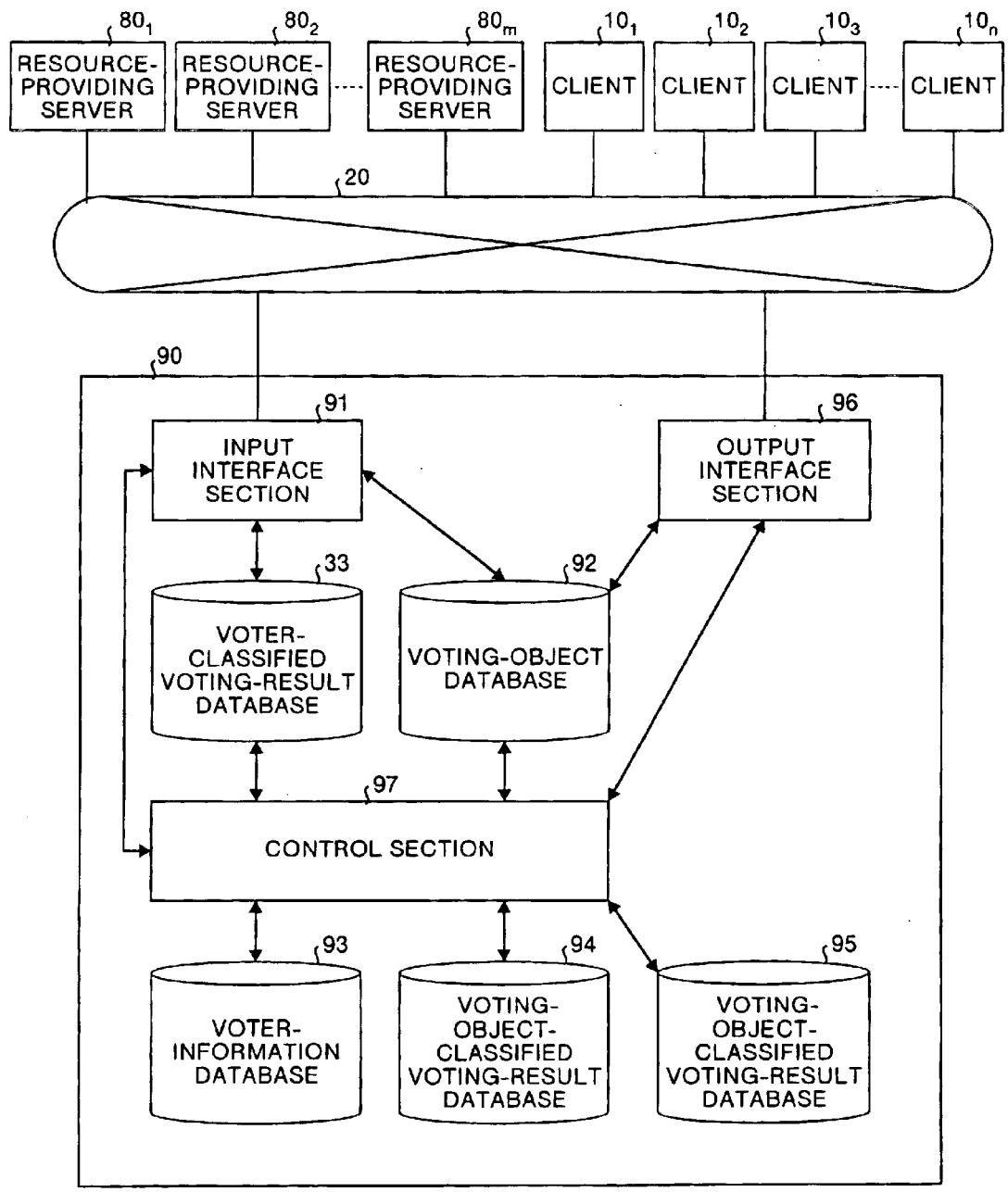
FIG. 14 is a block diagram showing a configuration of a third embodiment.

FIG. 14 is a block diagram showing a configuration of the third embodiment of the present invention. In FIG. 14, a portion corresponding to a portion in FIG. 1 is provided with the same legends. In FIG. 14, resource-providing servers $80_1$ to $80_m$ and a voting/evaluation apparatus 90 are used instead of the commodity-providing server 15 and voting/evaluation apparatus 30 shown in FIG. 1.

Each of the resource-providing servers $80_1$ to $80_m$ is a server for providing a resource such as software for a member or a general purchaser. A resource-storing place is designated by a URL (Uniform Resource Locator). The voting/evaluation apparatus 90 is connected to Internet 20 and has functions for performing acceptance of voting-object information, management of voting, and totalization of voting results.

In the case of the voting/evaluation apparatus 90, an input interface section 91 has a function for accepting the access of client $10_1$ to $10_n$ and a function for updating a voting-object database 92 and a voter-information database 93. As shown in FIG. 16, the voting-object database 92 is a database for storing the information on voting objects (in this case, resources).

The voting-object database 92 is provided with fields of "voting-object ID", "resource name", "overall evaluation level", "download URL", and "price" and "maker". "voting object ID" denotes an identifier for identifying a resource. "Resource name" denotes the name of a resource. "Download ULR" denotes the information showing are source-storing place (resource-providing servers $80_1$ to $80_m$).

"Overall evaluation level" denotes an evaluation level decided through voting similarly to the case of the first embodiment, which is synonymous with "evaluation level" shown in FIG. 5. In this case, the overall evaluation level is set to the following five stages similarly to the case of the first embodiment.

| Evaluation level | Explanatory note |
| --- | --- |
| "1" | Very bad |
| "2" | Bad |
| "3" | Fair |
| "4" | Good |
| "5" | Very good |

"Price" denotes a selling price of a resource, which is stepwise set correspondingly to "overall evaluation level". That is, "price" rises as "overall evaluation level" rises but a selling price lowers as "overall evaluation level" lowers. "Maker" denotes the name or handle name of a person who makes a resource.

In FIG. 14, the voter-information database 93 is provided with fields of "voter ID", "name" of a voter, "voter rank", "voting frequency", and "accumulated point" as shown in FIG. 15. "Voter ID" denotes an identifier for identifying a voter. "Name" denotes the name of a voter. "Voter rank" is synonymous with the case of the first embodiment, which is set to five stages of A to E. Therefore, "voting frequency" and "accumulated point" are also synonymous with the case of the first embodiment.

That is, in the case of the third embodiment, a newly-registered voter starts with "voter rank"=E (lowest rank) and the accumulated point increases by continuing a high-reliability evaluation, and when the accumulated point exceeds a predetermined threshold value, the voter is upgraded to the next "voter rank". Moreover, "accumulated point" is used for calculation of incentive (present, pay) as a compensation for voting.

Figures 17, 18:
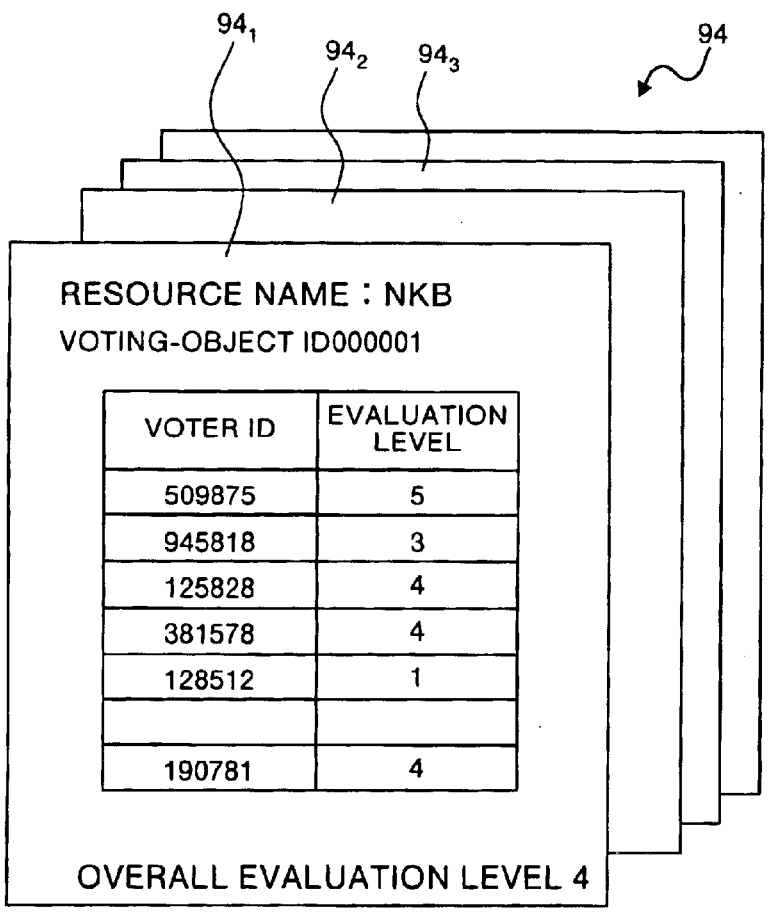
FIG. 17 is an illustration showing the voting-object-classified voting-result database 94 shown in FIG. 14.
FIG. 18 is an illustration showing the overall-evaluation-level/price relating table 95 shown in FIG. 14.

In FIG. 14, the voting-object-classified voting-result database 94 is a database for storing pieces of voting-object-classified voting-result information $94_1$ to $94_3$, . . . as shown in FIG. 17. Each of the pieces of voting-object information 941 to 943, . . . is the information of a voting result (voter ID/evaluation level, overall evaluation level) of each voting object (resource). In this case, the overall evaluation level is synonymous with "evaluation level" shown in FIG. 5. For example, the piece of voting-object-classified voting-result information $94_4$ corresponds to the resource of the voting ID 000001 shown in FIG. 16.

In FIG. 14, an overall-level/price-relating table 95 is a table for defining the between overall evaluation level of resource and price. As shown in the overall-evaluation-level/price-relating table 95, in the case of the third embodiment, the price stepwise rises as the overall evaluation level rises. An output interface section 96 has a function for outputting information to external access means such as the clients $10_1$ to $10_n$. A control section 97 controls operations of the input interface section 91 and output interface section 96 and updates the voting-object-classified voting-result database 94 and voter-information database 93. Details of operations of the control section 97 be described later.

Figure 19:
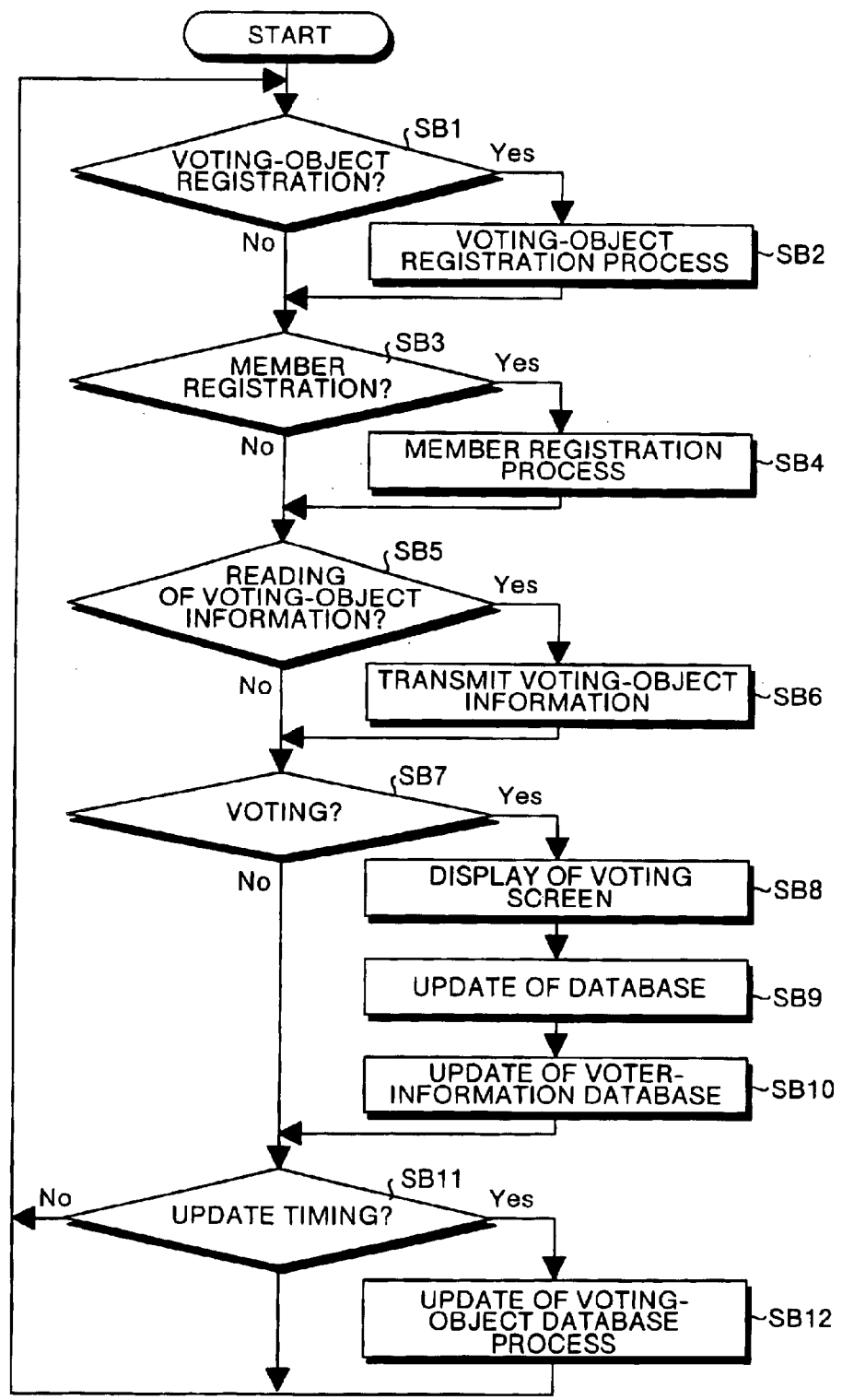
FIG. 19 is a flowchart for explaining operations of the third embodiment.

Then, operations of the above third embodiment are described below by referring to the flowchart shown in FIG. 19. In step SB1, the control section 97 determines whether there is a request for registering a voting object (resource) In this case, when the above request is issued from the client $10_1$, the control section 97 sets the determination result in step SB1 to "Yes". When the determination result in step SB1 is "No", the control section 97 performs the determination in step SB3.

In step SB2, the control section 97 executes voting-object registration. Specifically, the control section 97 accepts registration of voting-object information from the member concerned and then, adds the voting information to the voting-object database 92 (refer to FIG. 16). In step SB3, the control section 97 determines whether there is a request for member registration. In this case, it is assumed that the determination result is "Yes". In step SB4, the control section 97 executes member registration similarly to the case of step SA2 (refer to FIG. 8). When the determination result in step SB5 is "No", the control section 97 performs the determination in step SB5.

In step SB5, the control section 97 determines whether a request for reading the voting-object information in the voting-object database 92 shown in FIG. 16 is issued. In this case, when a request for reading the information is issued by a voter for operating the client $10_1$, the control section 97 set the determination result in step SB5 to "Yes". However, when the determination result in step SB5 is "No", the control section 97 performs the determination in step SB7.

In step SB6, the output interface section 96 refers to the voting-object database 92 shown in FIG. 16 and transmits voting-object information to the client $10_1$ which is a request source. Thereby, the voter concerned selects a desired resource from the voting-object information and then, downloads the resource from URL. Then, the voter actually uses the resource.

In step SB7, the control section 97 determines whether a request for voting is issued. In this case, when a voting request is issued from the voter who operates the client $10_1$, the control section 97 sets the determination result in step SB7 to "Yes". However, when the determination result in step SB7 is "No", the control section 97 performs the determination in step SB11. In this case, in step SB8, the control section 97 makes the client $10_1$ display a voting screen (not illustrated) similarly to the case of step SA5 (refer to FIG. 8).

The voting screen is a screen for a voter to vote the evaluation of are source actually used. Moreover, evaluation levels of five stages from very bad (1) to very good (5) are set to the voting screen. Then, the voter selects one of the five-stage evaluation levels and then presses a voting button (not illustrated) to perform voting. In step SB9, the control section 97 executes the processing for reflecting the above voting result on the voter-classified voting-result database 33 shown in FIG. 4.

Moreover, the control section 97 performs the overall evaluation level calculation for calculating the overall evaluation level of a voting object similarly to the case of step SA7 (refer to FIG. 8) and then, updates the voting-object-classified voting-result database 94 shown in FIG. 17 in accordance with the result of the overall evaluation level calculation.

In step SB10, similarly to the case of step SA8 (shown in FIG. 8), the control section 97 calculates the point and voter rank of the voter performing voting in step SB8 in accordance with a voting result and then, updates the voter-information database 93 shown in FIG. 15.

In the case of the third embodiment, when a high-reliability evaluation is continuously performed similarly to the case of the first embodiment, the average point rises and the voter rank stepwise rises. However, in the case of the third embodiment, when a low-reliability evaluation is continuously performed, the average point lowers and the voter rank stepwise lowers (or the voter rank is kept at the voter rank E (lowest rank).

In step SB11, the control section 97 determines whether now is the time (e.g. once a month) for updating the voting-object database 92 shown in FIG. 16. When the determination result is "No", processings in and after step SB1 are repeated. Then, when the determination result in step SB11 becomes "Yes", the control section 97 retrieves the overall-evaluation-level/price relating table 95 shown in FIG. 18 to decide the latest price by using the latest overall-evaluation level relating to a resource as a key in step SB12. Then, the control section 97 updates "price" in the voting-object database 92 shown in FIG. 16 to the latest value.

As described above, according to the third embodiment, the price of are source is decided in accordance with objective and fair overall evaluation. Therefore, it is possible to provide a proper price.

The first embodiment is a case in which a book review is used as voting-object information. However, voting-object information is not restricted to a book review. It is also allowed to use commodity evaluation information (such as use feeling) as voting-object information. Hereafter, this case is described as fourth embodiment. For the fourth embodiment, a case of picking out an able music artist from anonymous music artists in accordance with a voting result is described as an example.

Figure 20:
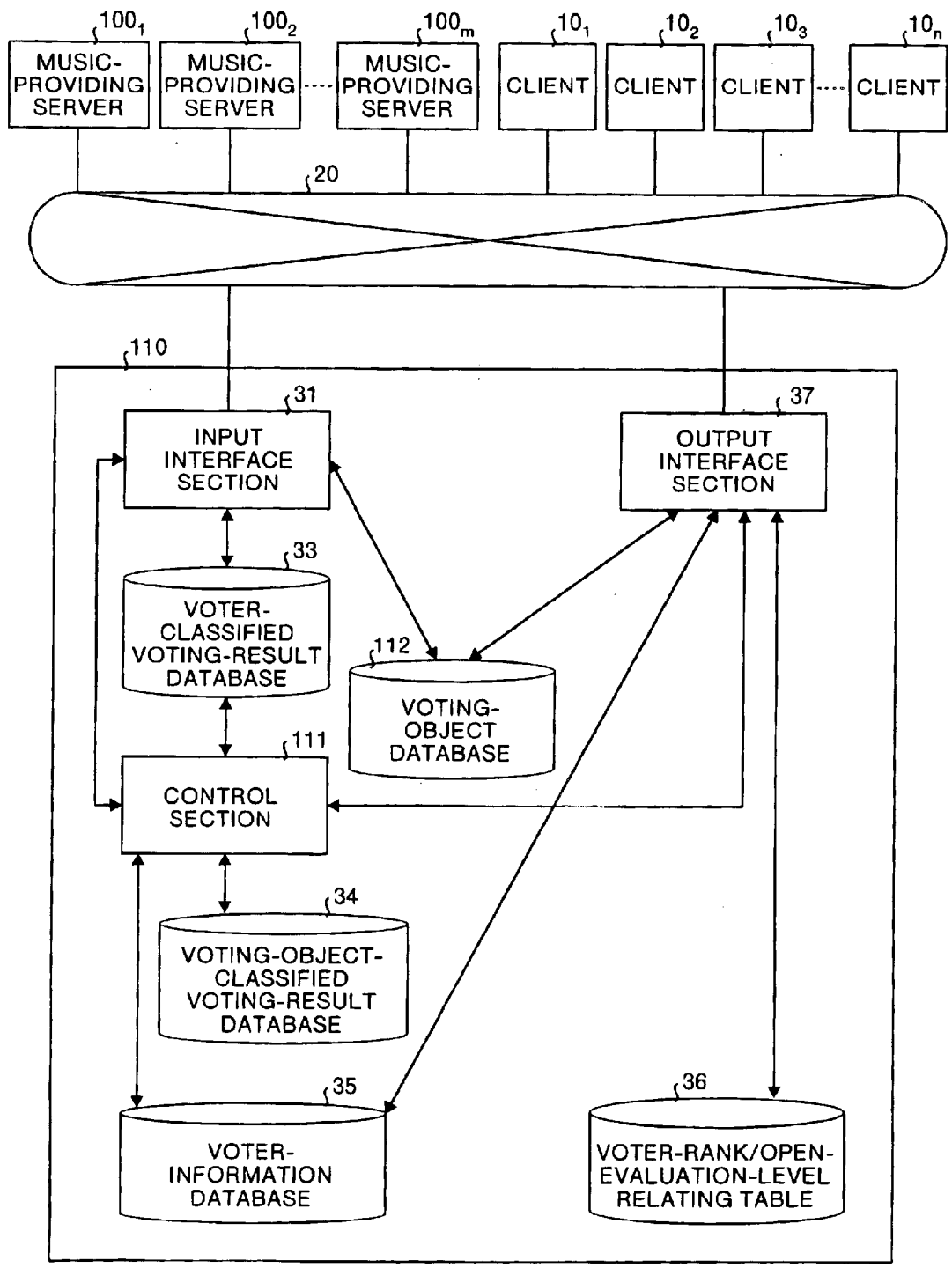
FIG. 20 is a block diagram showing a configuration of a fourth embodiment of the present invention.

FIG. 20 is a block diagram showing a configuration of the fourth embodiment of the present invention. In FIG. 20, a portion corresponding to that in FIG. 1 is provided with the same legends. In FIG. 20, music-providing servers $100_1$ to $100_m$ and a voting/evaluation apparatus 110 are used instead of the commodity-providing server 15 and voting/evaluation apparatus 30 shown in FIG. 1. In the case of the voting/evaluation apparatus 110, a control section 111 and a voting-object database 112 are used instead of the control section 38 and voting-object database 32 shown in FIG. 1.

Each of the music-providing servers $100_1$ to $100_m$ serves as a server for providing music contents for a member or a general purchaser. A music-contents storing place is designated by a URL. The voting/evaluation apparatus 110 is connected to Internet 20 and has functions for performing acceptance of voting-object information and totalization of voting results.

In the voting/evaluation apparatus 110, the control section 111 controls various sections and details of operations of the control section 111 will be described later. As shown in FIG. 20, the voting-object database 112 has fields of "voting-object ID", "title of music", "overall-evaluation level", "download URL", and "artist name".

"Voting-object ID" denotes an identifier for identifying music contents. "Title of music" denotes the title of music contents. "Overall-evaluation level" denotes an evaluation level decided through voting similarly to the case of the first embodiment, which is synonymous with "evaluation level" shown in FIG. 5. In this case, an overall evaluation level is set to the following five stages similarly to the case of the first embodiment.

| Evaluation level | Explanatory note |
| --- | --- |
| "1" | Very bad |
| "2" | Bad |
| "3" | Fair |
| "4" | Good |
| "5" | Very good |

"Download URL" is the information showing a music-contents storing place (one of music-providing servers $100_1$ to $100_m$). "Artist name" denotes a music-contents player name or band name.

Figure 22:
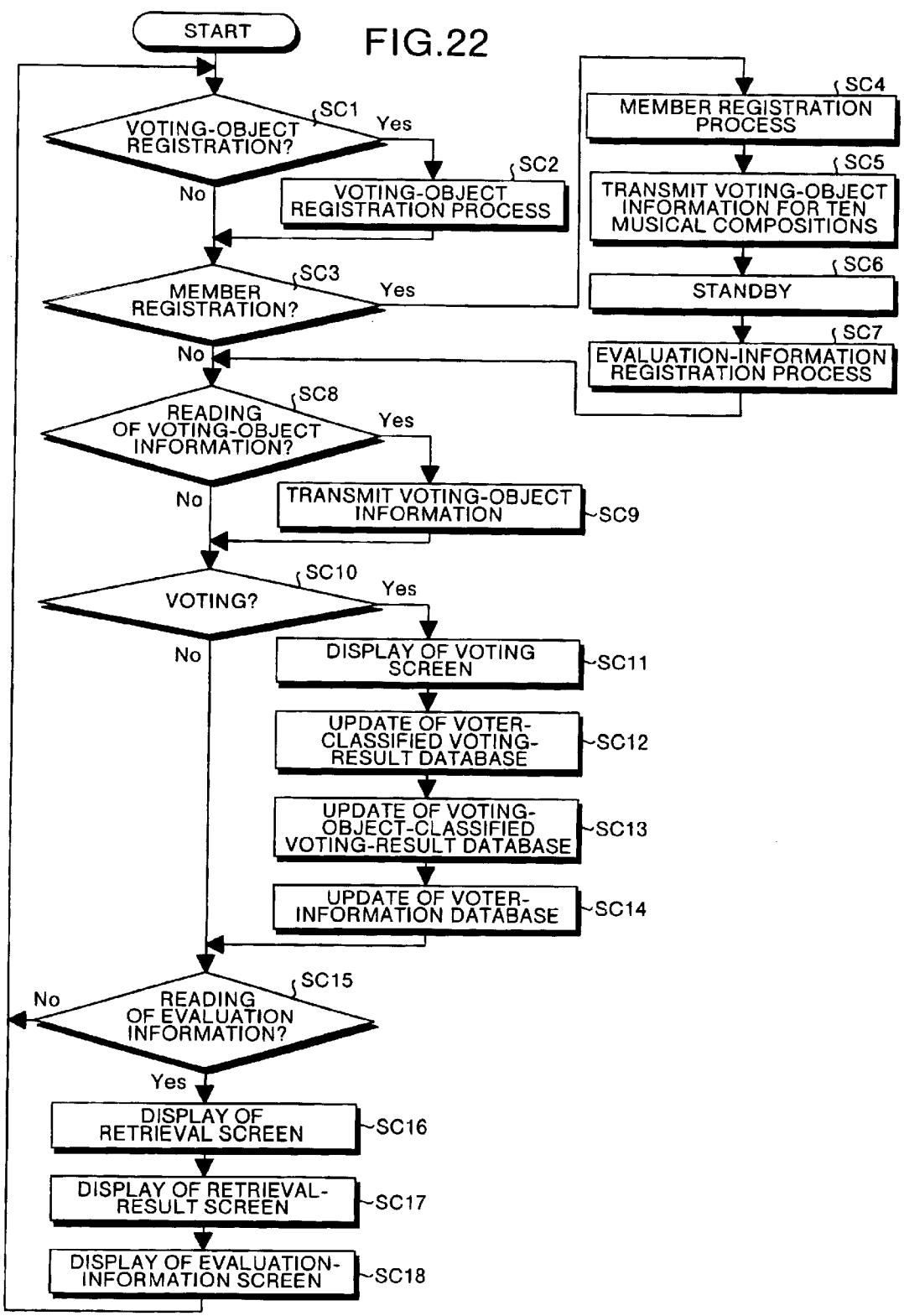
FIG. 22 is a flowchart for explaining operations of the fourth embodiment.

Then, operations of the above fourth embodiment are described below by referring to the flowchart shown in FIG. 22. In step SC1 shown in FIG. 22, the control section 111 determines whether there is a request for registration of a voting object (in this case, music contents). In this case, when the above request is issued from the client 101, the control section 111 sets the determination result in step SC1 to "Yes". When the determination result in step SC1 is "No", the control section 111 performs the determination in step SC3.

In step SC2, the control section 111 executes voting-object registration. Specifically, the control section 111 accepts voting-object information from the member concerned and then, adds the voting-object information to the voting-object database 112 (refer to FIG. 12) in step SC2. In step SC3, the control section 111 determines whether there is a request for member registration. In this case, it is assumed that the determination result is "Yes". In step SC4, the control section 111 executes member registration similarly to the case of step SA2 (refer to FIG. 8). However, when the determination result in step SC3 is "No", the control section 111 performs the determination in step SC8.

In step SC5, an output interface section 37 transmits the voting-object information for ten musical compositions to the client $10_1$ from the voting-object database 112. Thereby, a voter downloads music contents for the ten musical compositions from the music-providing servers $100_1$ to $100_m$ and listens to them on trial and then, evaluates each music content. In step SC6, the control section 111 waits for predetermined time. In step SC7, the control section 111 accepts the information on the above evaluation from the voter.

In step SC8, the control section 111 determines whether a request for reading voting-object information is issued from a voter (in this case, reader). When the determination result is "No", the control section 111 executes processings in and after step SC10. When the determination result in step SC8 is "Yes", the output interface section 37 transmits voting-object information to the client $10_1$ from the voting-object database 112 in step SC9.

In step SC10, the control section 111 determines whether a voting request is issued. In this case, when a voting request is issued from a voter who operates the client 101, the control section 111 sets the determination result in step SC10 to "Yes". However, when the determination result in step SC10 is "No", the control section 111 performs the determination in step SC15. In this case, the control section 111 makes the client $10_1$ display a voting screen (not illustrated) similarly to the case of step SA5 (refer to FIG. 8) in step SC11.

This voting screen is a screen for a voter to vote the evaluation of music contents actually listened by the voter on trial. Moreover, evaluation levels of five stages from very bad (1) to very good (5) are set to the voting screen. Furthermore, the voter selects one of the five-stage evaluation levels and then presses a voting button (not illustrated) to perform voting. In step SC12, the control section 111 executes the processing for reflecting the voting result on the voter-classified voting-result database 33 shown in FIG. 4.

In step SC13, the control section 111 performs overall-evaluation-level calculation for calculating the overall-evaluation level of a voting object similarly to the case of step SA7 (refer to FIG. 8) and then, updates the voting-object-classified voting-result database 34 shown in FIG. 5 in accordance with the result of the overall-evaluation-level calculation. In this case, "overall evaluation level " of the voting-object database 112 shown in FIG. 21 is also updated. In step SC14, the control section 111 updates the voter-information database 35.

In step SC15, the control section 111 determines whether a request for reading evaluation information is issued from a voter (in this case, reader). When the determination result is "No", the control section 111 executes processings in and after step SC1. The evaluation information includes evaluation levels in accordance with voting-object information and the above-described voting (refer to FIG. 5). In this case, when the above reading request is issued from a voter having the over ID 000002 shown in FIG. 6 by using the client $10_2$, the control section 111 sets the determination result in step SC15 to "Yes".

In step SC16, the output interface section 37 makes the client $10_2$ display a retrieval screen (not illustrated) for retrieving the evaluation information to be read by the voter concerned. In step SC17, the output interface section 37 retrieves the voting-object database 112 (refer to FIG. 21) and makes the client $10_2$ display the retrieval result.

Figure 8:
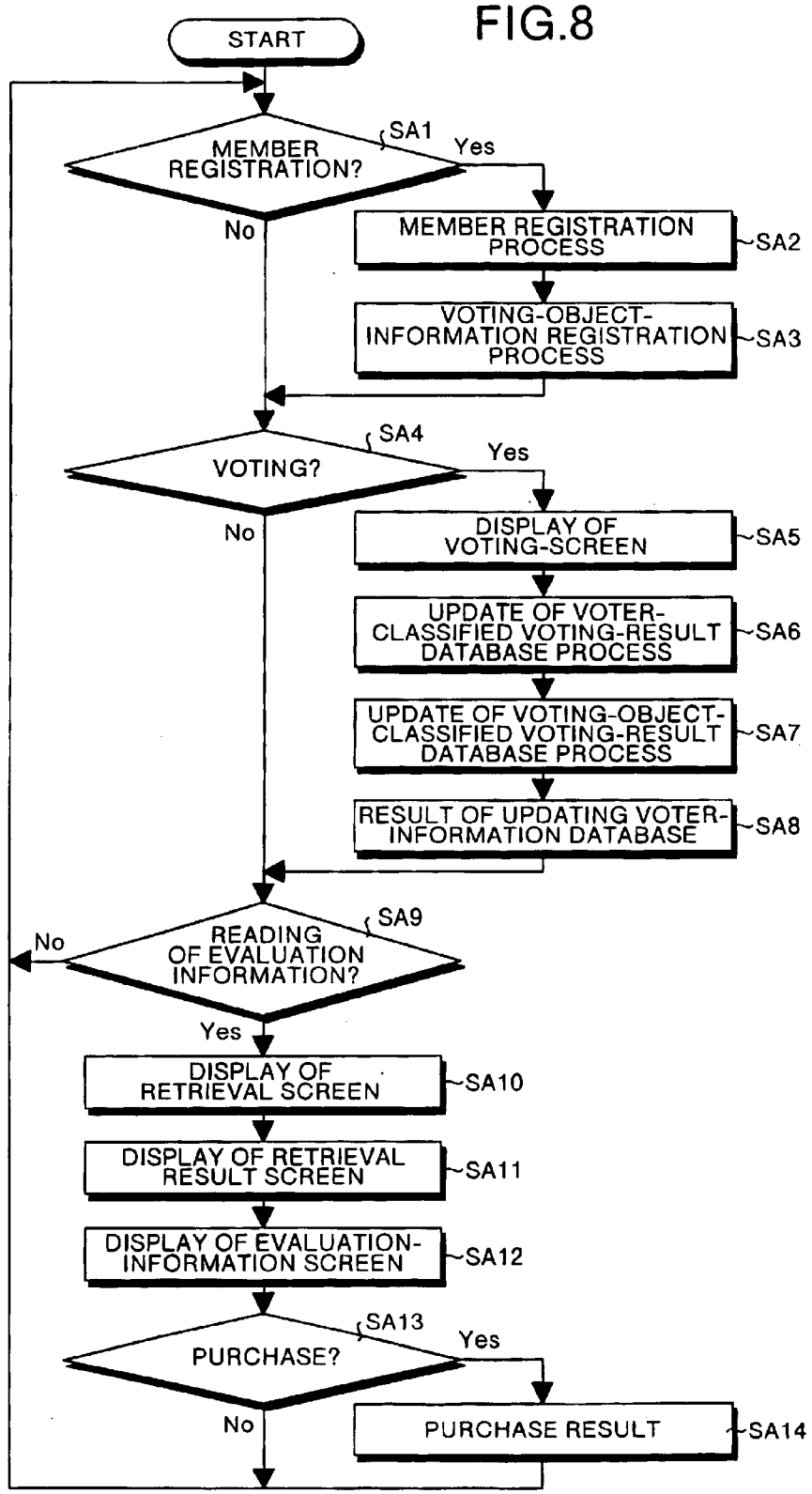
FIG. 8 is a flowchart for explaining operations of the first and second embodiments.

In step SC18, the output interface section 37 executes the processing for making the client $10_2$ display an evaluation information screen (not illustrated) similarly to the case of step SA12 (refer to FIG. 8). In this case, a voter who requests evaluation information reading can read the voting-object information and evaluation levels in a range corresponding to the voter level of his own.

As described above, according to the fourth embodiment, a voter rank is decided in accordance with a deviation between average evaluation with a voting system and evaluation by a voter and overall evaluation about music contents is decided in accordance with a result of weighting a voting result correspondingly to the voter rank. Therefore, it is possible to prevent illegal manipulation of a voting result and perform objective and fair evaluation.

The first to four embodiments of the present invention are described above in detail by referring to the accompanying drawings. However, specific configurations are not restricted to these first to four embodiments. Design modifications are included in the present invention as long as the modifications are not deviated from the gist of the present invention. For example, in the case of the above first to four embodiments, it is allowed to perform voting/evaluation by storing an evaluation program with a voting system for realizing functions of the voting/evaluation apparatus 30, 70, 90, or 110 in the computer-readable recording medium 300 shown in FIG. 23, and making the computer 200 illustrated in FIG. 23 read and execute the evaluation program with the voting system recorded in the recording medium 300.

Figure 23:
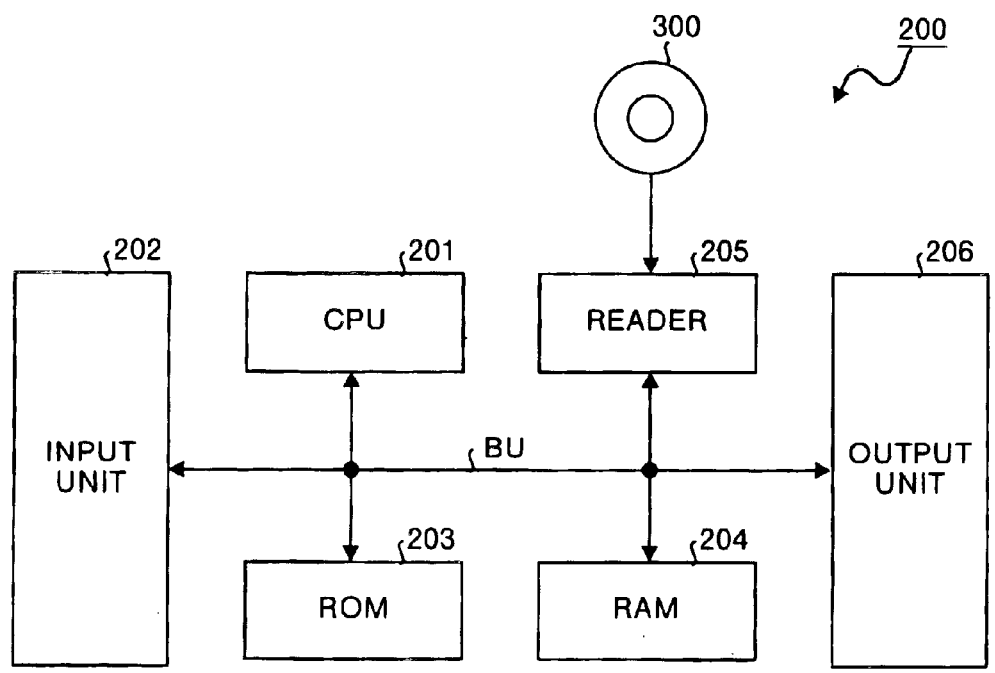
FIG. 23 is a block diagram showing a modification of the first to four embodiments.

The computer 200 shown in FIG. 23 is constituted of a CPU 201 for executing an evaluation program with the voting system, input units 202 including a keyboard and a mouse, a ROM (Read Only Memory) 203 for storing various data, a RAM (Random Access Memory) 204 for storing operation parameters, a reader 205 for reading an evaluation program with a voting system from the recording medium 300, output units 206 including a display and a printer, and a bus BU for connecting various sections of the units.

The CPU 201 performs the above voting/evaluation by reading an evaluation program with a voting system stored in the recording medium 300 via the reader 205 and then executing the evaluation program with the voting system. The recording medium 300 includes not only a portable recording medium such as an optical disk, floppy disk, or hard disk but also a transmission medium for temporarily storing data such as a network.

As described above, the present invention has an advantage that it is possible to prevent illegal manipulation of a voting result and performs objective and fair evaluation because a voter rank is decided in accordance with a deviation between average evaluation with a voting system and evaluation by a voter and overall evaluation is determined in accordance with a result of weighting a voting result correspondingly to the voter rank.

Moreover, it is possible to prevent illegal manipulation of a voting result and perform objective and fair evaluation because a voter rank is decided so that a voter rank rises as a deviation decreases and the voter rank lowers as the deviation increases.

Furthermore, it is possible to improve the will of a voter and resultantly obtain high-reliability evaluation because an incentive point is provided for a voter correspondingly to a voter rank.

Furthermore, it is possible to provide a proper price because the price of a commodity relating to voting-object information is decided in accordance with objective and fair overall evaluation.

Furthermore, it is possible to awaken the will for raising a voter rank in voter's mind in order to widen an open range.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An evaluation apparatus with a voting system, comprising:
   a voting unit which makes a plurality of voters respectively vote an evaluation of information to be evaluated in accordance with the voting system, the information to be evaluated comprising at least two or more selections and each voted evaluation comprising a selection of one of the selections;
   an average-evaluation calculating unit which calculates an average evaluation comprising an average of the voted evaluations of the information to be evaluated in accordance with voting results obtained by the voting unit;
   a voter-rank decision unit which automatically determines voter ranks, the voter ranks comprising a voter rank of each of the voters, by using deviations between the average evaluation of the information to be evaluated as calculated by the average-evaluation calculating unit and each voted evaluation of the information to be evaluated that was voted by the voters being ranked; and
   an overall-evaluation determining unit which determines an overall evaluation of the information to be evaluated by weighting the voting results of the voting unit according to the voter ranks calculated by the voter-rank decision unit.

2. The evaluation apparatus with a voting system according to claim 1, wherein said voter-rank decision unit determines the voter ranks so that the voter ranks rise as the deviations decrease and lower as the deviations increase.

3. The evaluation apparatus with a voting system according to claim 1, further comprising a point providing unit which provides an incentive point for each of the voters in accordance with the voter ranks.

4. The evaluation apparatus with a voting system according to claim 1, further comprising a price deciding unit which determines a price of an object relating to the information to be voted in accordance with the overall evaluation.

5. The evaluation apparatus with a voting system according to claim 1 further comprising a disclosure-range control unit which controls disclosure ranges of the overall evaluation and the information to be voted in accordance with the voter ranks.

6. An evaluation apparatus according to claim 1, further comprising an output interface unit which outputs a data to a computer terminal at one of the voters, wherein the computer terminal displays an evaluation-information screen displaying the overall evaluation of the information to be evaluated.

7. An evaluation method with a voting system, comprising:

allowing a plurality of voters respectively to vote an evaluation of information to be evaluated in accordance with the voting system, the information to be evaluated comprising at least two or more selections and each voted evaluation comprising a selection of one of the selections, whereby voting results are generated;

calculating an average evaluation comprising an average of the voted evaluations of the information to be evaluated in accordance with the generated voting results;

automatically determining a voter ranks, the voter ranks comprising a voter rank of each of the voters, by using deviations between the average evaluation of the information to be evaluated and each voted evaluation of the information to be evaluated that was voted by the voters being ranked;

determining an overall evaluation of the information to be evaluated by weighting the generated voting results according to the calculated voter ranks.

8. The evaluation method with a voting system according to claim 7, wherein the voter ranks are determined so that the voter ranks rise as the deviations decrease and lower as the deviations increase.

9. The evaluation method with a voting system according to claim 7, further comprising providing an incentive point for each of the voters in accordance with the voter ranks.

10. The evaluation method with a voting system according to claim 7, further comprising determining a price of an object relating to the information to be voted in accordance with the overall evaluation.

11. An evaluation method according to claim 7, further comprising outputting a data to a computer terminal at one of the voters, wherein the computer terminal displays an evaluation-information screen displaying the overall evaluation of the information to be evaluated.

12. A volatile or non-volatile machine-readable storage storing information to perform the method according to claim 7.

13. A method of ranking a voter, comprising:

receiving votes on a voting-subject information from voters over a data network, the voting-subject information comprising at least two or more selections on the voting-subject and each vote comprising a selection of one of the selections;

automatically calculating an average vote of the voting-subject based on the votes received over the network;

for each of voters that are to be ranked, automatically determining a respective rank based on a statistical deviation of a voter to be ranked with reference to the automatically calculated average vote of the voting-subject information; and calculating a weighted overall evaluation of the voting-subject information by weighting the voting-subject votes of the respective ranked voters according to their respective determined ranks.

14. A volatile or non-volatile machine-readable storage storing information to perform the method according to claim 13.

* * * * *